United States Patent [19]

Sankovic et al.

[11] Patent Number: 5,540,046
[45] Date of Patent: Jul. 30, 1996

[54] METHOD AND APPARATUS FOR PRESSURE PULSE ARCJET STARTING

[75] Inventors: John M. Sankovic, Brecksville; Francis M. Curran, Avon, both of Ohio

[73] Assignee: The United States of America as represented by the Administrator of the National Aeronautics and Space Administration, Washington, D.C.

[21] Appl. No.: 236,855

[22] Filed: May 2, 1994

[51] Int. Cl.$^6$ .................... F03H 1/00; H05H 5/00
[52] U.S. Cl. .............................. 60/203.1; 60/204
[58] Field of Search ..................... 60/139.141, 202, 60/203.1, 204

[56] References Cited

U.S. PATENT DOCUMENTS

| | | | |
|---|---|---|---|
| 4,577,461 | 3/1986 | Cann | 60/203.1 |
| 4,800,716 | 1/1989 | Smith et al. | 60/203.1 |
| 4,805,400 | 2/1989 | Knowles | 60/203.1 |
| 4,907,407 | 3/1990 | Simon | 60/205.1 |
| 5,076,051 | 12/1991 | Naff | 60/203.1 |
| 5,111,656 | 5/1992 | Simon | 60/203.1 |

OTHER PUBLICATIONS

AIAA–87–1951, Low Power Arcjet Thruster Pulse Ingnition Charles Sarmiento and Robert P. Gruber, propulsion Conference Jun. 29–Jul. 2, 1987.

*Primary Examiner*—Louis J. Casaregola
*Attorney, Agent, or Firm*—Vernon E. Williams; Kent N. Stone

[57] ABSTRACT

The invention disclosed is directed to a method and apparatus for an arcjet starter. The invention discloses a method of moving an arc from the subsonic region of the thruster to the supersonic region by introducing a pressurized propellant into the casuty of the anode.

4 Claims, 14 Drawing Sheets

5,540,046

METHOD AND APPARATUS FOR PRESSURE PULSE ARCJET STARTING

ORIGIN OF THE INVENTION

The invention described herein was made by employees of the United States Government and may be manufactured and used by or for the Government for governmental purposes without the payment of any royalties thereon or therefore.

FIELD OF INVENTION

The present invention is directed to a method and apparatus for pressure pulse arcjet starting.

Arcjet starting has primarily gained prominence as a research area because of the role of an arcjet in the propulsion system of a geosynchronous body. For example, in most satellite systems geosynchronous orbit is maintained by frequent firing of on-board propulsion systems. Without the propulsion system readjustment of these satellites, they would be susceptible to north south drifts and therefore lose their geosynchronous orbit. One of the keys to propulsion system readjustment is the frequent firing of a propulsion system is the arcjet starter.

The geosynchronous stationkeeping of the normal communication satellite may require that an arcjet start over 1000 times during the lifetime of the operation. As a result, it is critical that these systems remain resilient during the 1000 start lifetime.

The state of the art arcjet system uses a high voltage pulse to ignite the arc discharge. Propellant is then released in the region between the cathode and the anode and heated as it flows past the arc. The arc is struck between a cathode and an anode. When the arc is initially struck it attaches to a point on the anode upstream of the throat in a small area, similar to arc welding. This is a highly destructive undesirable situation, because the high energy concentration into a small point erodes the anode wall. After ignition, gas dynamic drag forces will push the arc into a supersonic portion of the nozzle where the arc becomes diffuse, therefore, it attaches evenly azimutually over an axial length of several millimeters of the anode. Since this is over a large surface area of the anode this mode of operation is not destructive to the anode. Therefore, the sooner the gas dynamic drag forces of the system can push the arc downstream, the less destruction to the anode and the longer the life of the arcjet thruster. Starting power is very low, compared to steady-state power. To increase the performance while maintaining the same power level, the flow rate in an arcjet must be decreased. Decreasing the flow rate causes the gas dynamic drag forces pushing the arc downstream into the supersonic region after ignition, to decrease. As a result, the time the arc remains in the destructive spot attached to the anode is increased, which in turn will cause an unacceptable failure of the engine.

It is therefore an object of the present invention to increase the number of starts in an arcjet.

It is another object of the present invention to increase the gas dynamic drag forces pushing the arc downstream considering the limited power constraint of the spacecraft.

It is still another object of the invention to increase the mass flow of the propellant during ignition and then decrease to a steady-state operating flow rate once the arc is blown into the supersonic region.

DESCRIPTION OF THE RELATED ART

U.S. Pat. No. 4,577,461 the present invention relates to increasing the thrust efficiency of arcjet thrusters by separating the gas flow into two flows, one of which is applied to the arc chamber and the second of which is used to cool the chamber prior to recombination of the flows. U.S. Pat. No. 4,800,716 this patent relates to a means of decomposing the propellant gas prior to arching, a means of repositioning the cathode to reduce current at startup, and a means of lowering the startup pressure to reduce chamber erosion.

U.S. Pat. No. 4,805,400 this patent relates to a means of varying the pressure flow to effect arc erosion of the thruster mechanism. U.S. Pat. No. 4,907,407 this patent relates to a means of reducing arc jet erosion by specifying the geometry of the cathode and anode.

U.S. Pat. No. 5,076,051 this patent relates to the cathode and anode as a vortex flow causing dispersion which reduces erosion effects during firing. U.S. Pat. No. 5,111,565 this patent relates to an arcjet nozzle geometry which increases efficiency of an arc jet thruster by reducing losses in a recombinant collet following diffusion.

SUMMARY OF THE INVENTION

The present invention is directed to a method of increasing the starts of an arcjet thruster.

In the present invention a steady state flow of propellant gas is introduced in an area between the anode and cathode of an arcjet thruster. Before ignition of the arcjet a high pressure propellant housed upstream of the nozzle is released. The pressurized gas causes a quick step increase in the region between the anode and the cathode of the arcjet thruster as a series of pulses is initiated. As the pressure and gas flow monotonically decreases, the pressure becomes low enough to allow the ignition of the arcjet. Since the pressure is still higher than the steady state pressure, the arc is quickly blown downstream into the supersonic region of the anode, where it is distributed around a larger area in the anode. As a result there is less destruction to the arcjet nozzle, thereby enabling more starts throughout the life of the thruster.

DESCRIPTION OF THE PREFERRED EMBODIMENT

Figure 1:
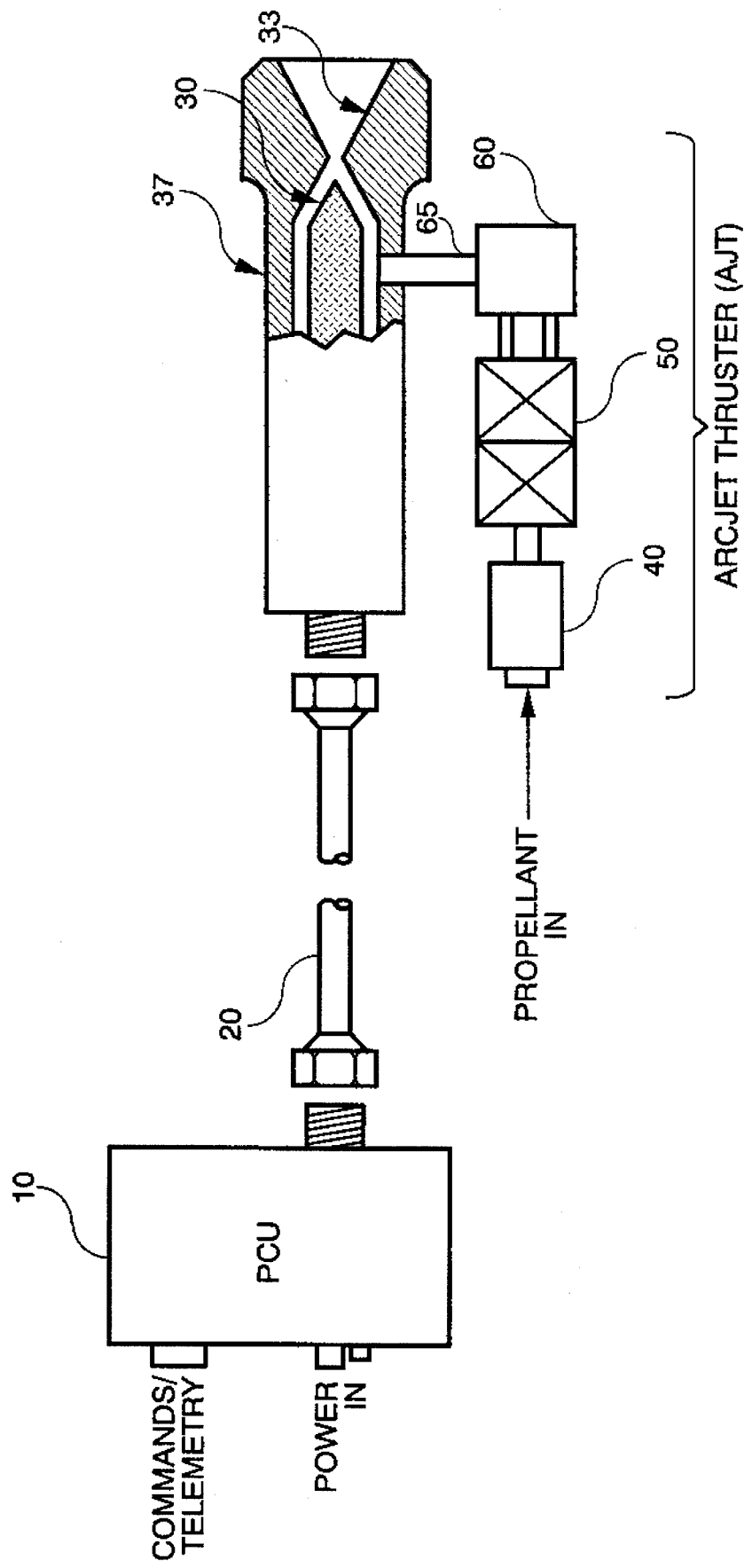
FIG. 1 displays a schematic view of the prior art arcjet thruster.

The preferred embodiment of the present invention is displayed in the schematic diagram of FIG. 1. In the arcjet displayed in FIG. 1, current is provided to the thruster through a power conditioning unit 10. Power is transmitted through a power cable 20 to the cathode 30. The power crosses to the anode 33 in the form of an arc an then returns through the body wall of the electrode assembly 37.

Propellant is supplied to the system through a fluid restrictor 40. The resistor 40, regulates the flow rate and the thruster operating pressure by creating a large pressure drop between the spacecraft propellant fluid system and the thruster. The thruster control valve 50 is a solenoid actuated dual redundant seat valve which controls propellant flow to a gas generator 60 which runs in an on/off mode. In the preferred embodiment hydrazine decomposition gases flow from the gas generator 60 through a delivery tube 65 to the annular passageway defined by the anode 37.

Figure 2:
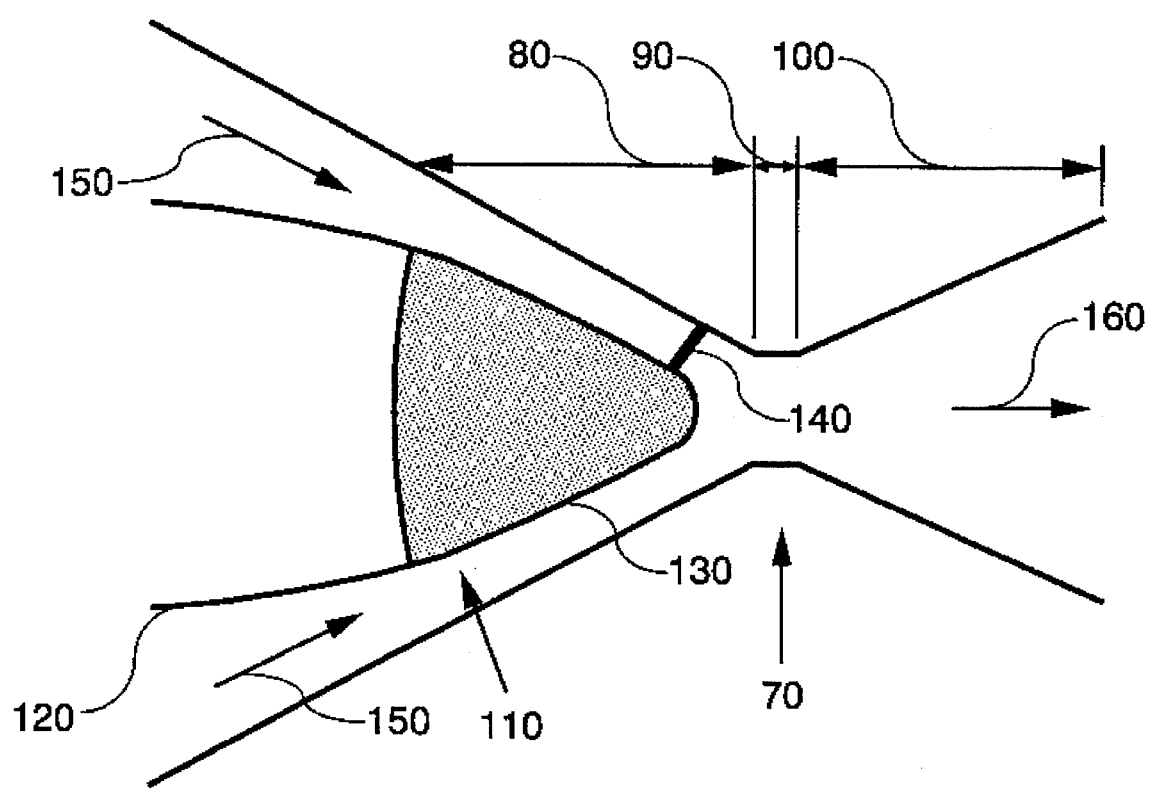
FIG. 2 displays a view of the node and cathode region of the thruster.

FIG. 2 displays an enlarged view of the electrode apparatus. The 15 anode 70 is defined by a subsonic region 80 a constrictor region 90 and a supersonic region 100. Inserted in the subsonic region is a cathode 110. The area 140 defines the distance between the anode 70 and the cathode 110. In the preferred embodiment gas flow 150 is usually introduced in the annular area of the anode, in the subsonic region 80. After travelling through the constrictor 90, the gas 160 is then ejected through the supersonic region 100.

Figure 3:
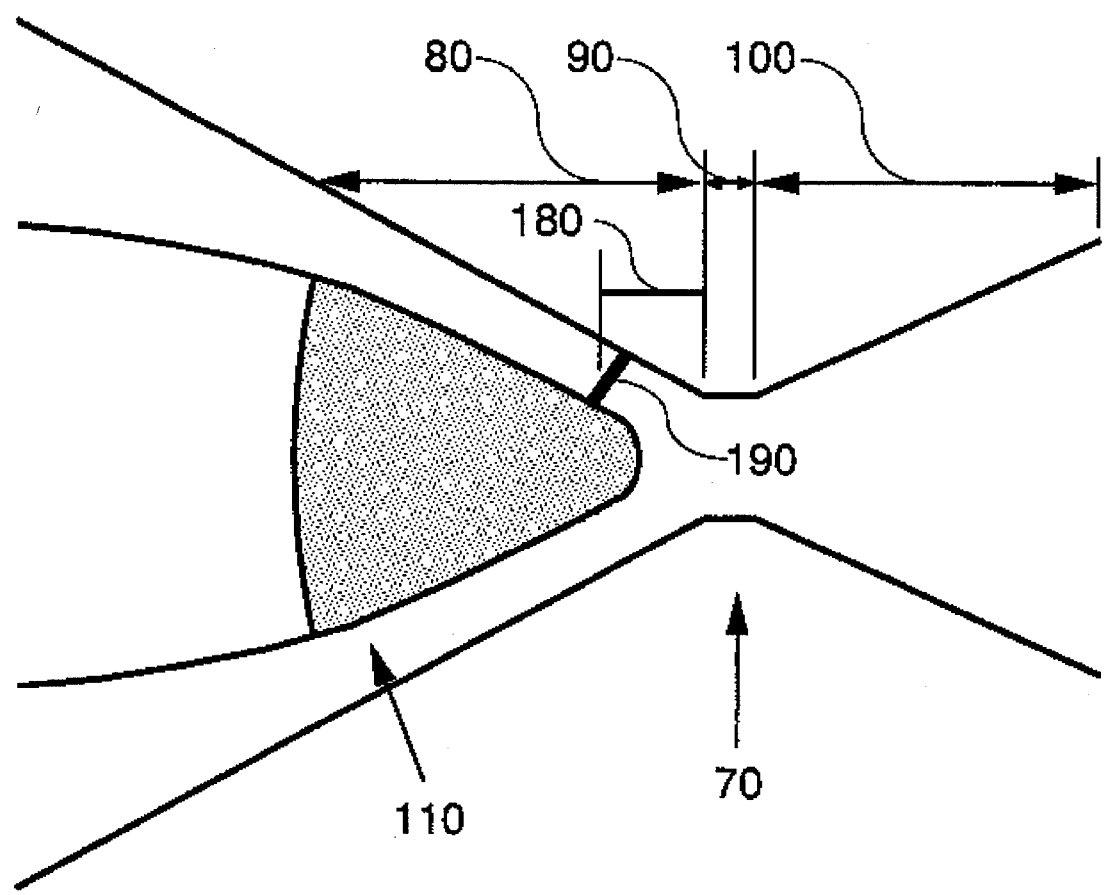
FIG. 3 displays a view of the anode and cathode region of the arcjet immediately after ignition.
Figure 4:
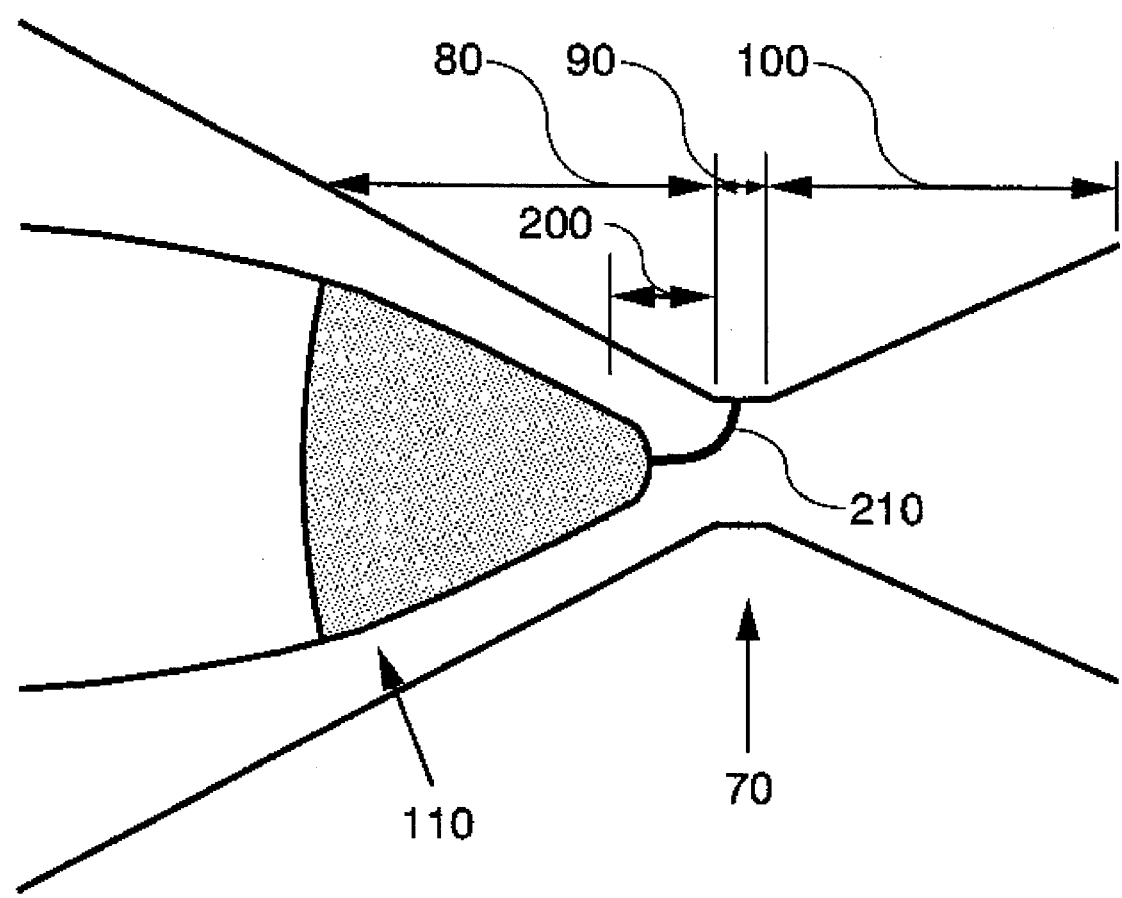
FIG. 4 displays a picture of the drag force pushing the arc down stream.
Figure 5:
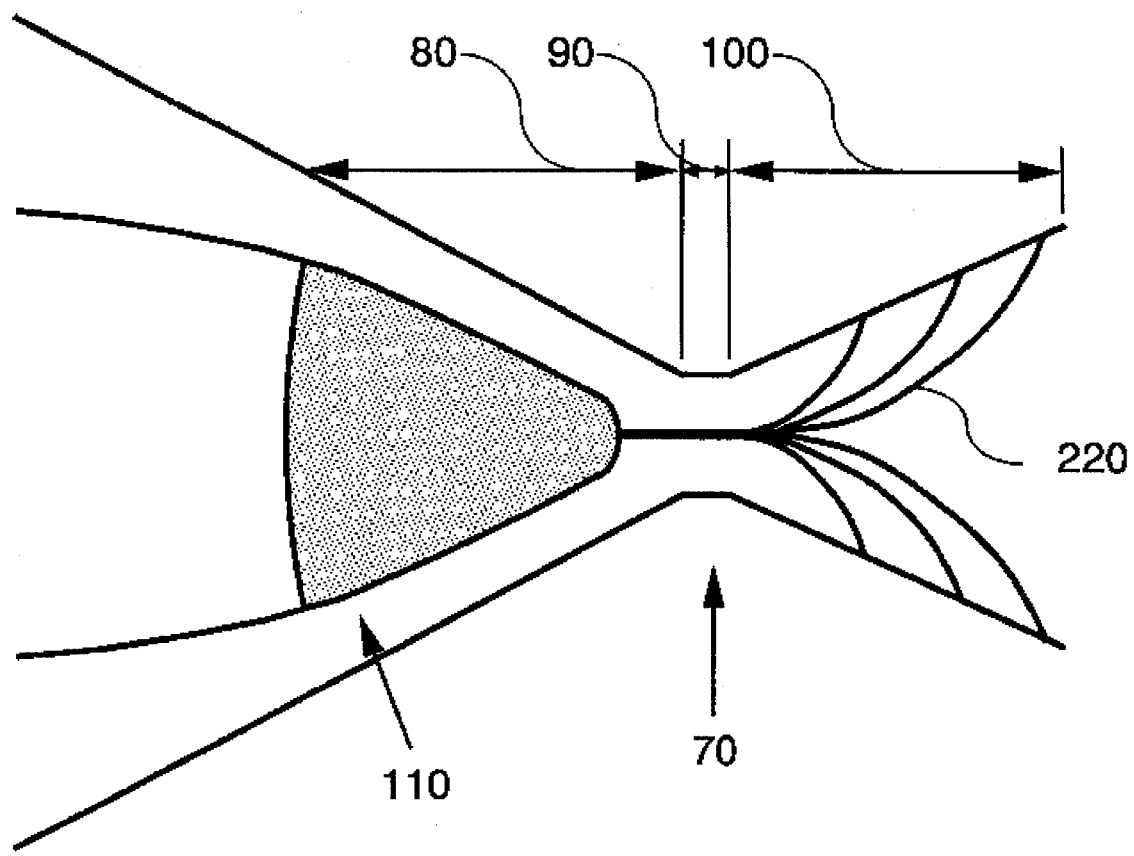
FIG. 5 displays a picture of the arc after it has been moved downstream.

In FIG. 3 the gap 180 between the beginning of the constrictor 90 and the beginning of the arc 190 is defined. In FIG. 4 the arc 190 in FIG. 3 has extended as displayed by the gap 200 displayed in FIG. 4, as the arc 210 moves farther into the constrictor. Lastly, in FIG. 5 the arc 220 has been blown into the supersonic region 100 of the anode by gas dynamic drag forces.

Figure 6:
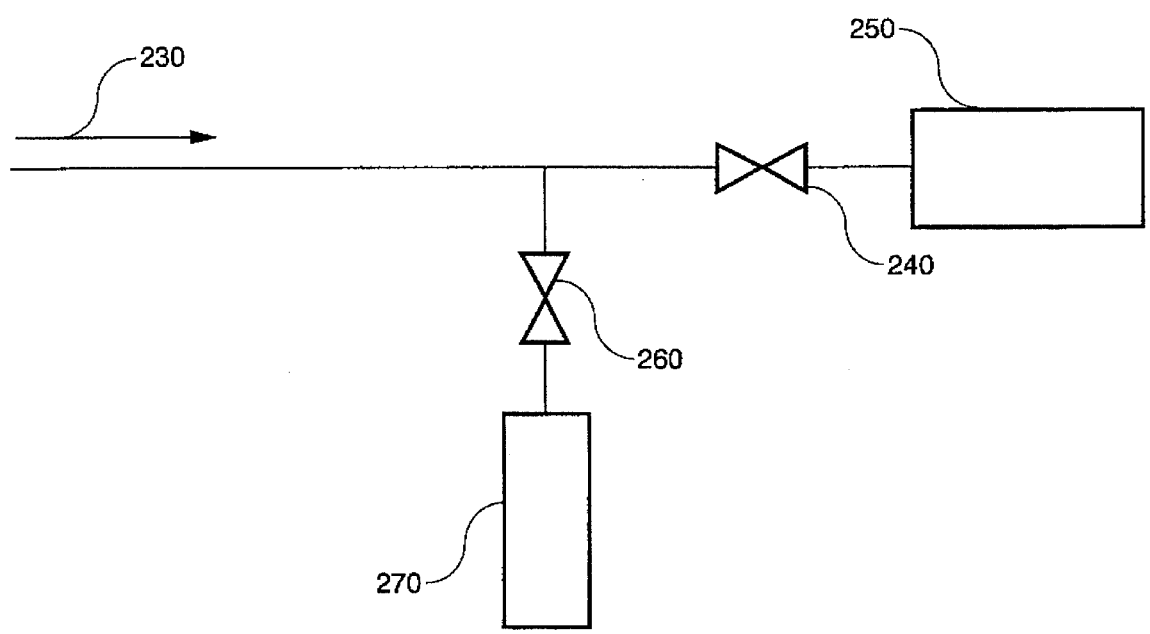
FIG. 6 displays a schematic of the pressure pulse arcjet starting mechanism.

There are several methods to generate a pressure pulse in the arcjet starter described above, FIG. 6 illustrates one technique. In FIG. 6 a first valve 240, which controls the steady-state flow of the gaseous propellant source 230 to the arcjet thruster 250 is closed and a second valve 260 is simultaneously opened allowing propellant to fill an accumulator 270. The second valve 260 is then closed isolating the accumulator and the first valve 240 is opened allowing the normal operating flow to pass from the propellant source 230 to the arcjet thruster 250, creating a first pressure in the arcjet thruster. A Pressure pulse is then created when the second valve 260 is opened. Opening the second valve 260 generates a step increase in the pressure in the thruster carrying the thruster up to a second pressure. Once the accumulator has discharged its pressurized propellant, the pressure in the thruster is then allowed to monotonically decrease to a level between the second and first pressures which will allow an arc to be struck between the anode and lathode.

Alternate Embodiments

Figure 7:
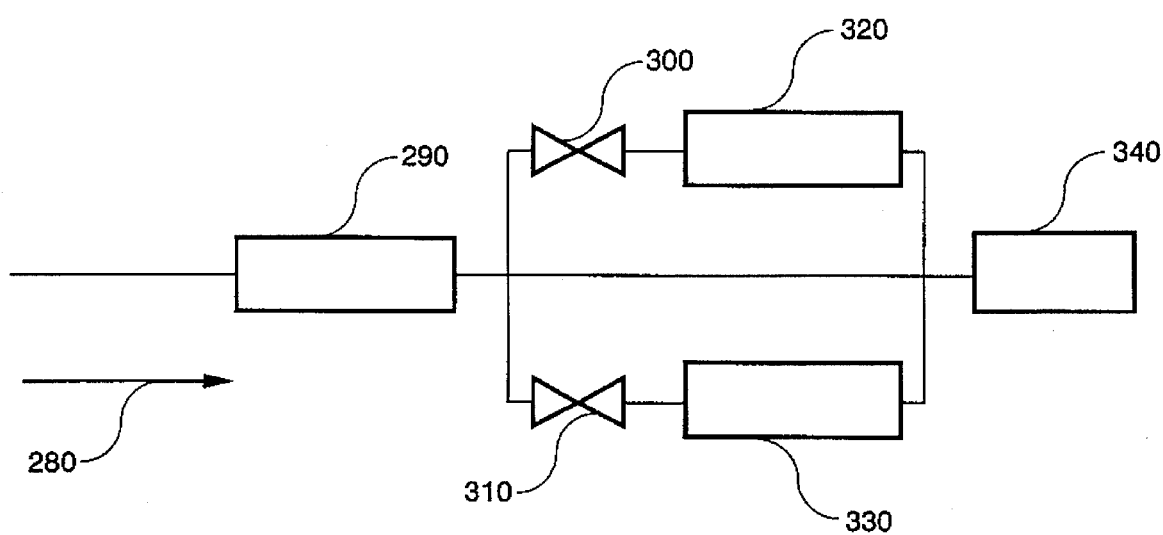
FIG. 7 displays a schematic of a flight system using the arcjet starter technique.

For a flight system using hydrazine as a propellant the embodiment displayed in FIG. 7 may be used. In FIG. 7 propellant from the space propellant feed system 280 is fed into the fluid resistor 290. Initially a first valve 300 is opened allowing propellant to flow to the arcjet 340 by way of a first gas generator 320. To achieve monotonically decreasing chamber pressure which is required to strike an arc in the arcjet 340 a second valve 310 is cycled open and close, thereby cycling gas to the arc jet 340 through a second gas generator 330.

Figure 8:
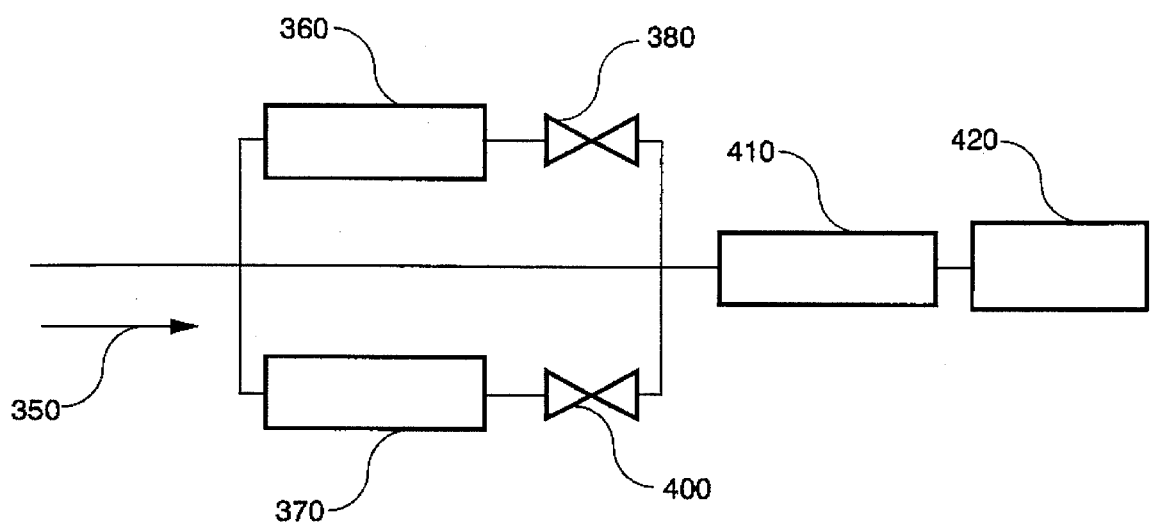
FIG. 8 displays an alternate flight system for implementation of the arc jet starter.

An alternate embodiment to the flight system presented in FIG. 7 is displayed in FIG. 8. In FIG. 8 the propellant 350 is fed into a first fluid resistor 360 and a second fluid resistor 370 simultaneously. A first valve 380 is opened allowing a steady state flow of propellant to pass through the fluid resistor 360 to the gas generator 410. The gas generator 410 then processes the propellant fluid and delivers it to the arcjet thruster 420. A second valve 400 serially attached to the second resistor 370, is cycled open and close causing an extra surge of propellant and a sudden increase in the chamber pressure of the arcjet thruster 420. The chamber pressure then decreases monotonically to a pressure that allows an arc to be struck between the cathode and the anode.

The initial pressure of the arcjet thruster, depends on the flow rate and the diameter of the nozzle used. In the present invention a 2:1 nitrogen/hydrogen mixture was used with a 0.25" nozzle diameter.

When the flow rates given below were applied, the following pressure resulted:

| Flow rate, mg/s | Pressure, psia |
|---|---|
| 45 | 42.2 |
| 37 | 34.3 |
| 30 | 29.3 |

The pressure attained after a release of propellant from the accumulator is a function of the volume of the propellant system, initial pressure, and the thruster geometry. For the test detailed above, the pressure was 85 psia.

The time required for the pressure to decrease to the ignition pressure is a function of the starting voltage pulse, the thruster throat diameter, the propellant flow rate; and the volume of the propellant system. For the apparatus used in the disclosed invention the time required for the pressure to decrease was 21 seconds.

The number of high voltage pulses required for starting depends on the frequency of the pulse and the rate of pressure decrease. In the test using a 37 mg/s flow rate with a pressure decrease of 215 and a pulse frequency of 12 Hz, 252 pulses resulted.

Figure 9:
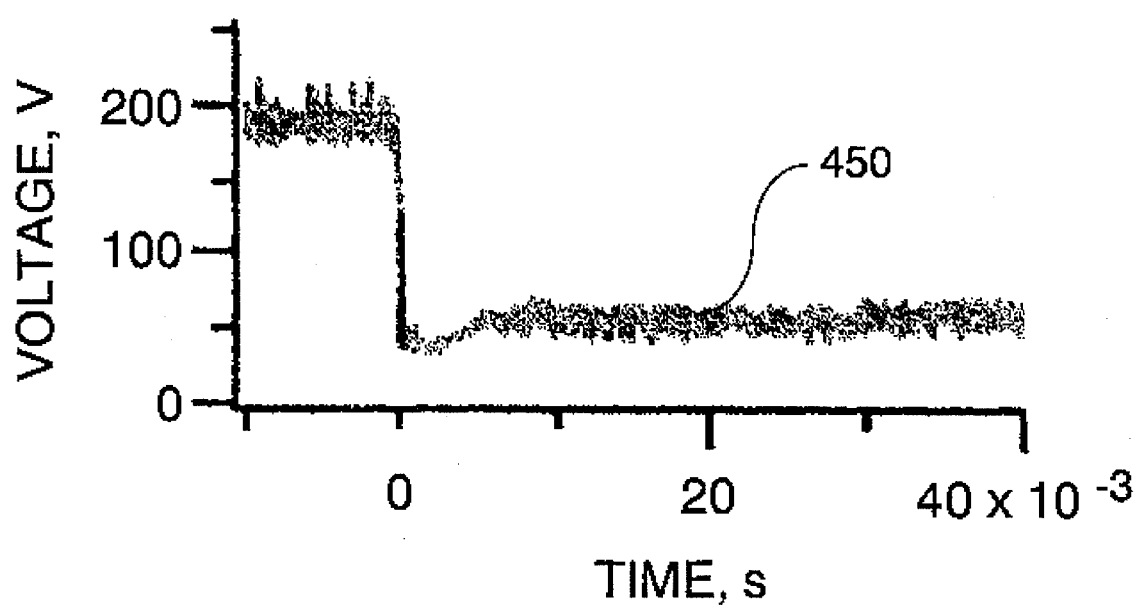
FIG. 9 displays a state of the art thruster at a flow rate of 44.8 mg/s.
Figure 10:
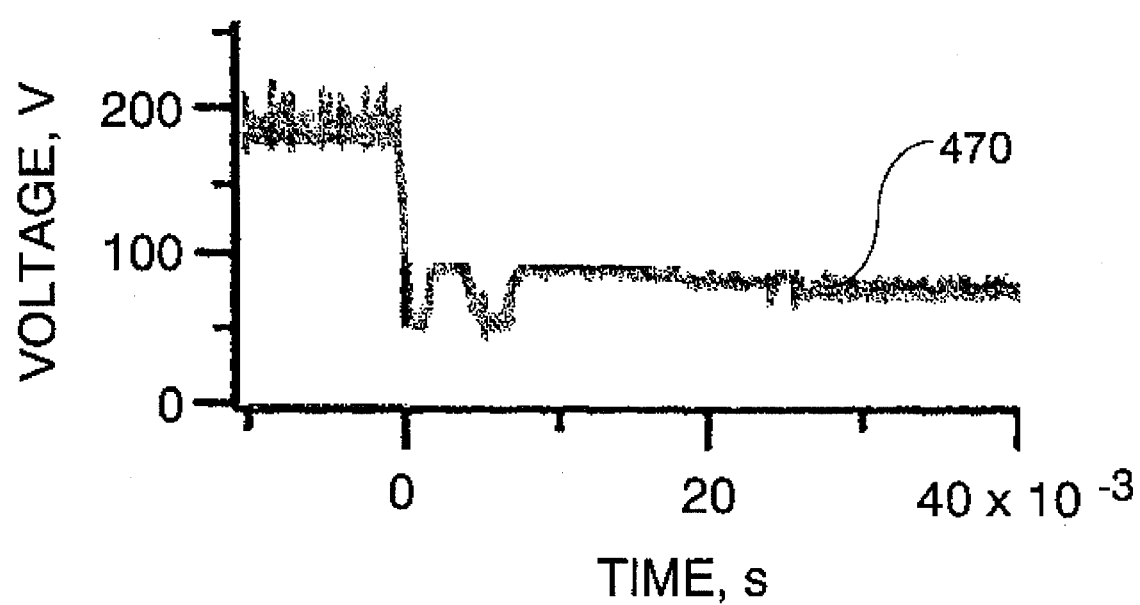
FIG. 10 displays a graph of an arcjet thruster using the pressure pulse technique at a flow rate of 44.8 mg/s.
Figure 11:
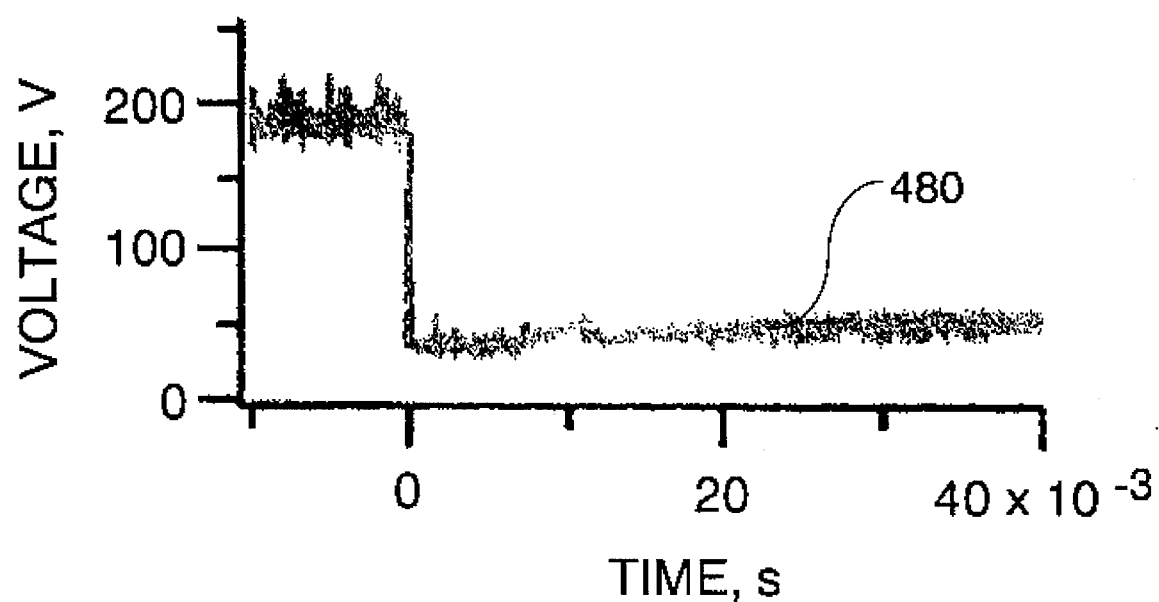
FIG. 11 displays a state of the art thruster at a flow rate of 33.0 mg/s.
Figure 12:
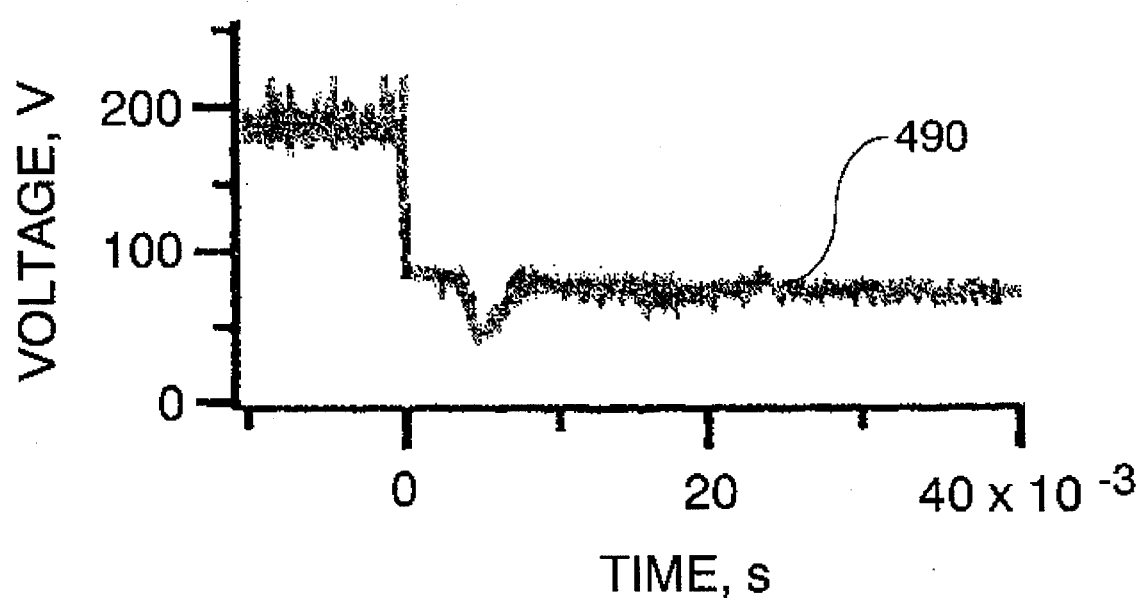
FIG. 12 displays a graph of an arcjet thruster using the pressure pulse technique at a flow rate of 33.0 mg/s.
Figure 13:
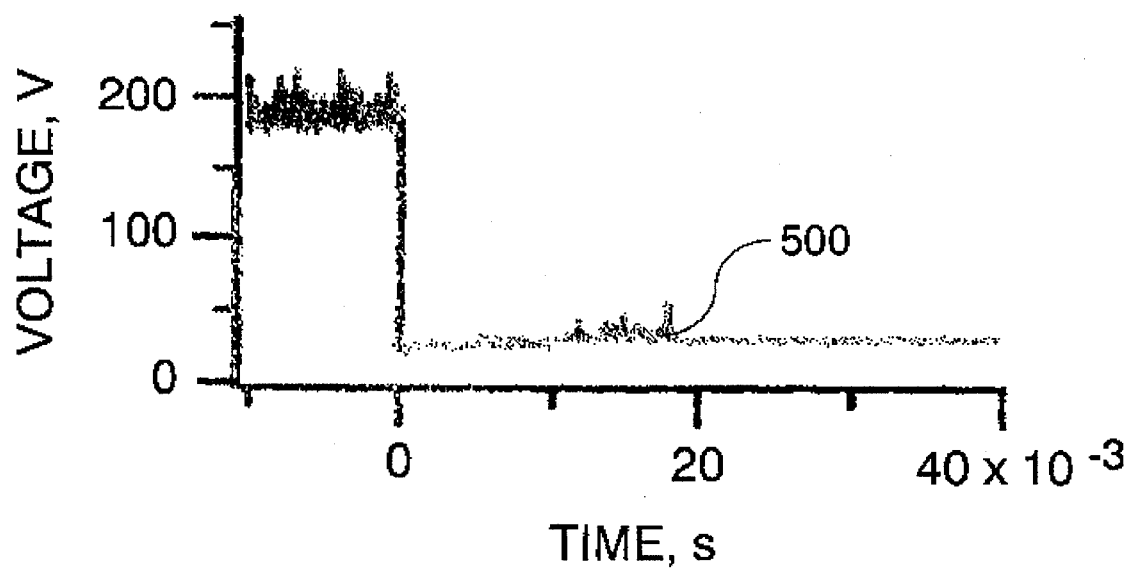
FIG. 13 displays a state of the art thruster at a flow rate of 21.3 mg/s.
Figure 14:
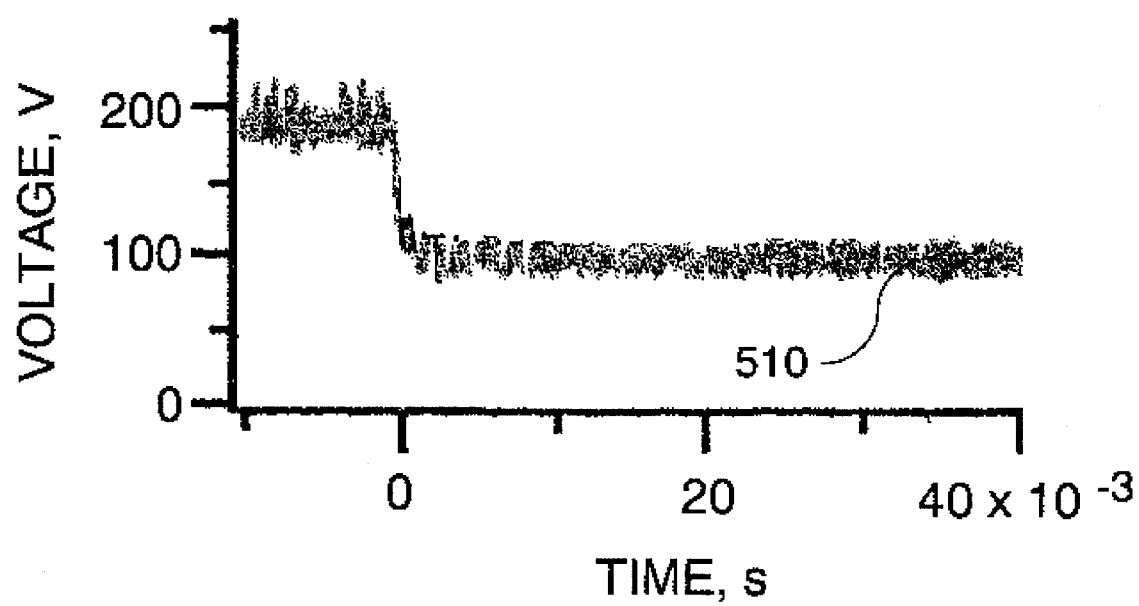
FIG. 14 displays a graph of an arcjet thruster using the pressure pulse technique at a flow rate of 21.3 mg/s.

The objective of the invention is to move the arcjet from "low mode" operation of 50 V to the high mode operation of 100 V or greater. At 50 v or below the arc is still in the subsonic reason, therefore, it is destructive. While in the "high mode" operation the arc has extended into the supersonic region and therefore is not destroying the arcjet thruster. With the state of the art drawings, FIGS. 9, 11, and 13, which represent flow rates of 44.8 mg/s, 33.0 mg/s and 21.3 mg/s respectively. The arcs are still in low mode (250 V) after 40 milliseconds. The graphs of the pressure pulse technique, FIGS. 10, 12 and 14 display the arcjet thruster performance at flow rates of 44.8 mg/s, 33.0 mg/s and 21.3 mg/s, respectively. The graphs show that with the pressure pulse technique the arcjet thruster is operating in "high mode" (voltage greater than 100), almost as soon as the thruster ignites at time 0.

While several embodiments of the method and apparatus of the arcjet starter have been disclosed, it will be appreciated that various modifications may be made without departing from the spirit of the invention and the scope of the subjoined claims.

What is claimed:

1. A method of starting an arcjet thruster, said thruster including an anode having a subsonic region and a supersonic region, said method comprising the steps of:

introducing a constant flow of propellant into said arcjet thruster thereby creating a first pressure in the subsonic region of said arcjet thruster, introducing additional propellant into said arcjet thruster whereby a pressure pulse is initiated thereby creating a second pressure which is higher than the first pressure in said arcjet thruster, initiating voltage pulses in said arcjet thruster whereby an arc is created in the subsonic region at a pressure higher than the first pressure, and blown from said subsonic region of said anode to said supersonic region of said anode in less time, due to the higher dynamic forces on the arc, than would occur if the arc was created the subsonic region at the first pressure.

2. A method as claimed in claim 1 wherein said voltage pulses are initiated as pressure in said arcjet thruster monotonically decreases from said second pressure to said first pressure.

3. A method of arcjet starting, said arcjet starter including, a power processing unit, a gas propellant source, an arcjet thruster, an accumulator, a first valve serially connected to said propellant source and the arcjet thruster, a second valve serially connected between said accumulator and the propellant source, said method comprising the steps of:

closing said first valve and opening said second valve, thereby filling said accumulator with propellant from said propellant source, closing said second valve and opening said first valve whereby gas flows from said propellant source to said arcjet thruster thereby creating a first pressure in said arcjet thruster, opening said second valve whereby gas flows from said accumulator through said first valve to said arcjet thruster thereby creating a second pressure in said arcjet thruster, utilizing said power processing unit to initiate a series of high voltage pulses in said arcjet thruster thereby starting said arcjet thruster.

4. A method as claimed in claim 3 wherein said high voltage pulses are initiated as said second pressure monotonically decreases to said first pressure.

* * * * *